United States Patent [19]
Burton

[11] 3,774,381
[45] Nov. 27, 1973

[54] PICKING ARM CONSTRUCTION IN A MACHINE FOR HARVESTING FRUIT GROWN ON PLANTS ARRANGED IN A ROW

[75] Inventor: Charles G. Burton, Lewiston, N.Y.

[73] Assignee: Chisholm-Ryder Company, Inc., Niagara Falls, N.Y.

[22] Filed: Apr. 10, 1972

[21] Appl. No.: 242,419

[52] U.S. Cl. .................................................. 56/330
[51] Int. Cl. ............................................ A01d 19/00
[58] Field of Search ................ 56/330, 328 R, 327, 56/28, 29, 33

[56] References Cited
UNITED STATES PATENTS

| 3,439,482 | 4/1969 | Orton | 56/330 |
| 3,611,689 | 10/1971 | Patzloff | 56/330 |
| 3,613,343 | 10/1971 | Sagouspe et al. | 56/330 |
| 3,688,482 | 9/1972 | Horn | 56/330 |
| 3,703,072 | 11/1972 | Patzlaff | 56/330 |

Primary Examiner—Russell R. Kinsey
Attorney—Sommer & Weber

[57] ABSTRACT

An improved picking arm construction in a machine for harvesting fruit grown on plants arranged in a row, such as grapes, the picking arm being fulcrumed on a support member movable back and forth transversely of the row, relative movement between such arm and member about such fulcrum being yieldingly restrained, and a finger on the trailing end of the picking arm and extending laterally therefrom.

18 Claims, 12 Drawing Figures

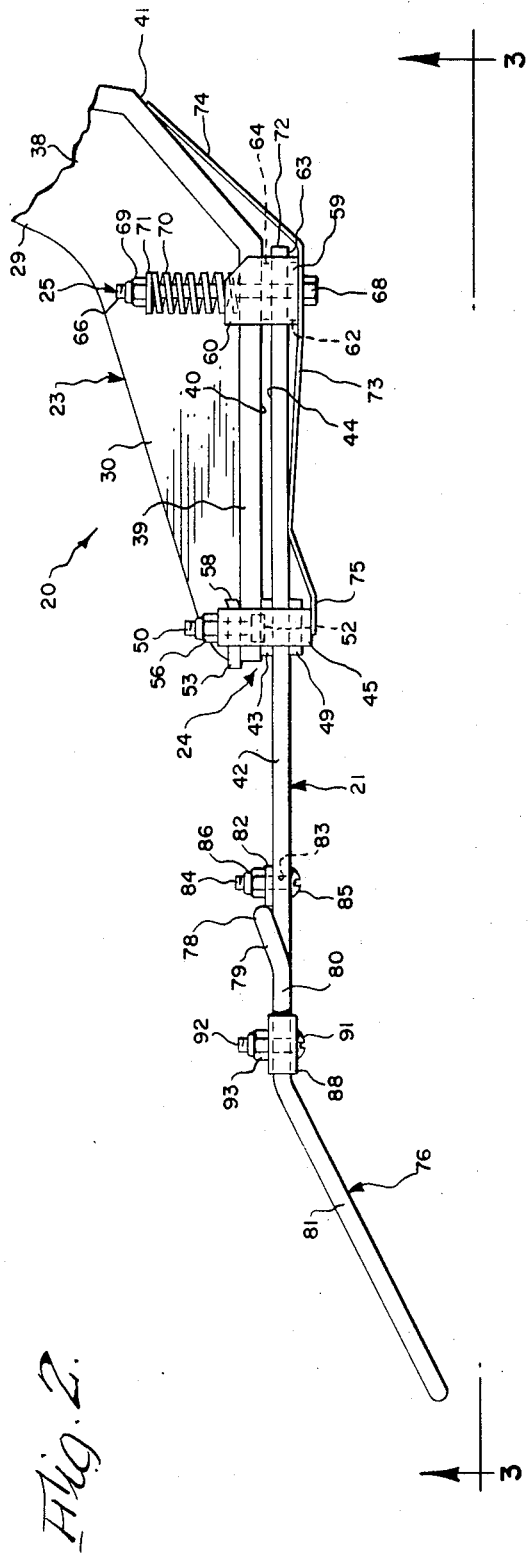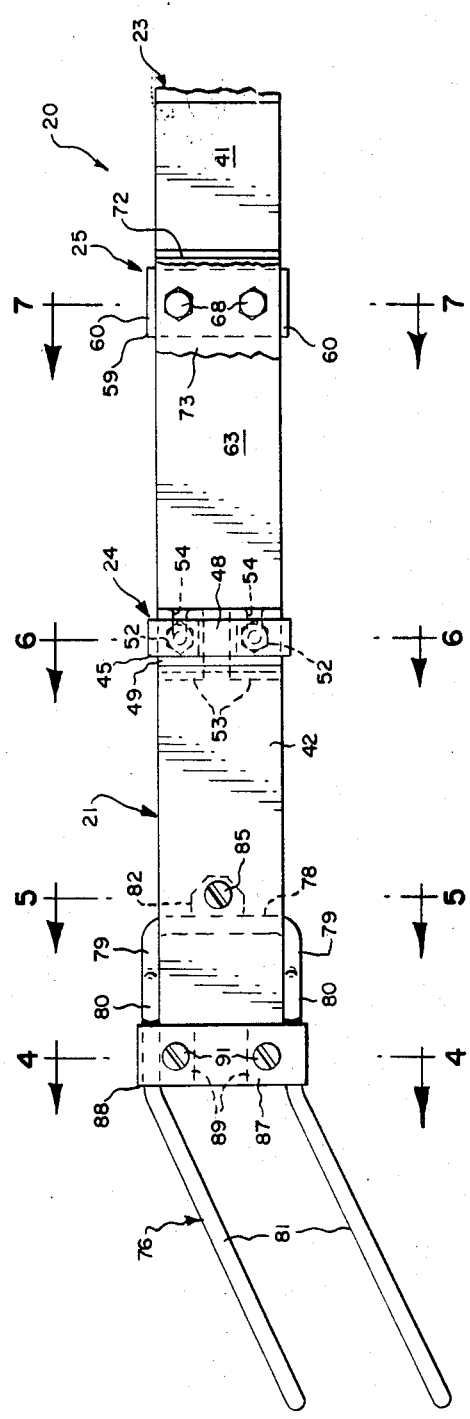

Patented Nov. 27, 1973
3,774,381
4 Sheets-Sheet 4
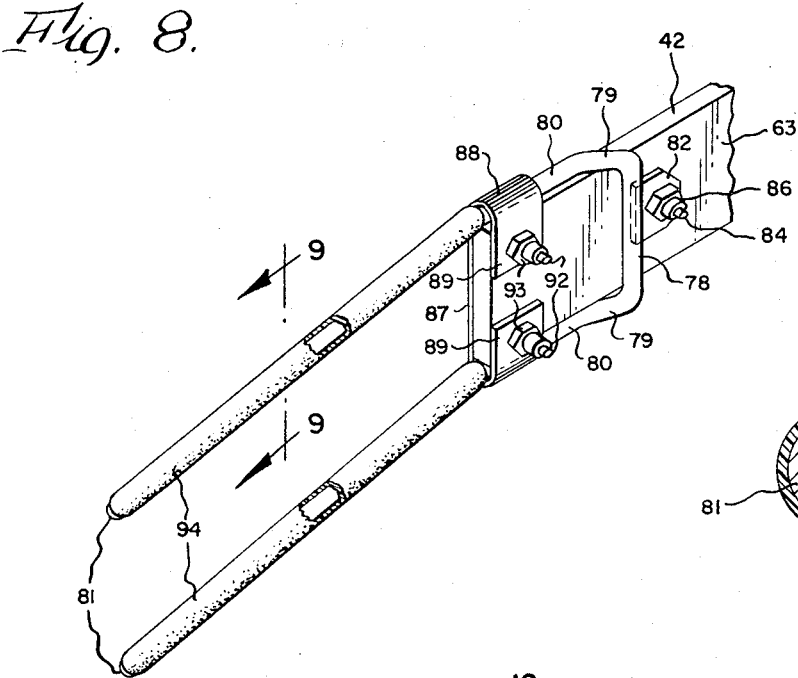
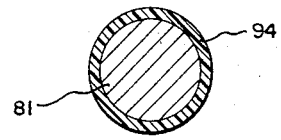
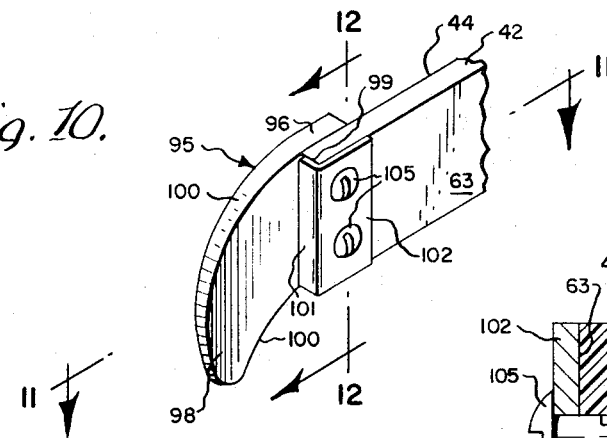
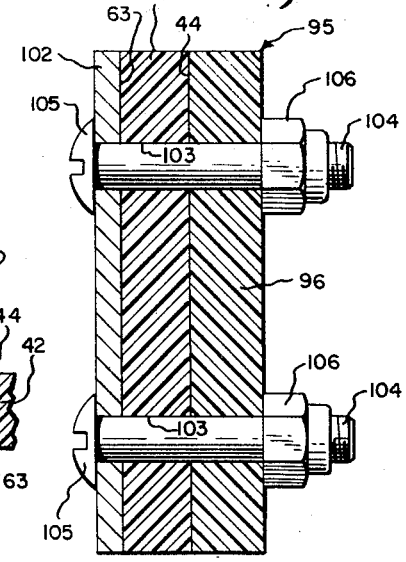
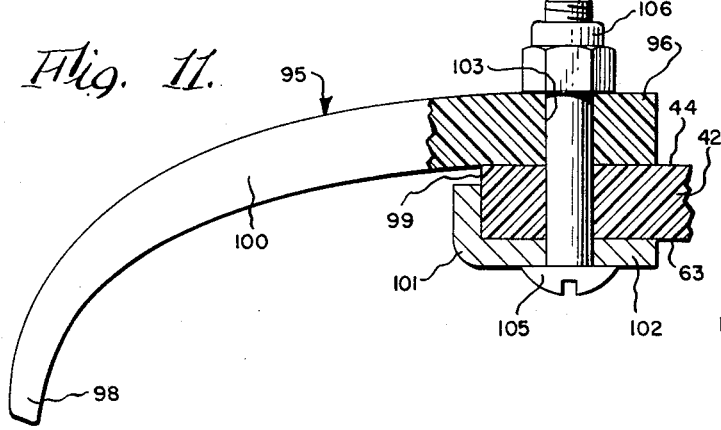

PICKING ARM CONSTRUCTION IN A MACHINE FOR HARVESTING FRUIT GROWN ON PLANTS ARRANGED IN A ROW

BACKGROUND OF THE INVENTION

It is known to provide a mechanical harvester which moves along a row of plants bearing fruit to be harvested, such as grapes, which harvester includes rearwardly and inwardly inclined shaker bars which move back and forth transversely of the row. Such a machine useful as a grape harvester is disclosed in Orton U.S. Pat. No. 3,439,482.

With such prior art type of grape harvester, the grapes are removed from the vines principally as individual berries rather than as clusters. Frequently the pedicel would be removed from the individual grape berry during harvesting leaving the berry with an opening through which juice would escape prior to processing and which also allowed accelerated deterioration of the berry to occur. Furthermore, not all conditions and varieties of grapevines are harvested mechanically with the same facility using such a prior art type of grape harvester, even though the degree of agitation of the vine might be varied by adjusting the frequency and amplitude of the shaker bars.

In my copending application filed concurrently herewith, Ser. No. 242,716, I have improved upon the straight shaker bar by providing a picking arm having a laterally extending finger on the trailing end of the arm. This allows a different angle of attack on the plant and was found to improve picking efficiency, as well as to pick more clusters or clumps of grapes. However, there was still found to be excessive wear of the picking arms through contact with cordon vines, plant trunks and posts between which the cordon vines extended, resulting in a shortened life of the arms. Inasmuch as these picking arms were cantilever-mounted and subjected to repeated flexing, they were made of fiber glass instead of metal in order to withstand better the fatigue which flexing produced. Also, the rate of wear was aggravated when the machine was not moved centrally along the row. Such offset of the centerline of the harvester with respect to the centerline of the row of vines caused excessive flexing of the picking arms on the side of the machine closer to the center of the row.

SUMMARY OF THE INVENTION

The present invention relates to an improved picking arm construction which overcomes the disadvantages of the prior art harvester having shaker bars, and represents a further improvement in a picking arm over that disclosed in my said copending application.

The principal object of the present invention is to provide a row plant fruit harvester having an effective and efficient picking arm but which is durable and has a longer life.

More specifically, an important object is to provide an improved picking arm which has greater stiffness in a vertical plane to improve grape stripping efficiency.

Another specific object is to provide such an improved picking arm which also has a greater stiffness in a horizontal plane to facilitate deeper penetration into the vine foliage while moving at a slower speed transversely of the vine and hence doing less damage to the grapes and vine.

Another specific object is to provide such an improved picking arm which is capable of absorbing shocks when engaging a relatively immovable object such as a post, plant trunk, or cordon vine as the harvester carrying the picking arm moves along a row of plants.

A still further specific object is to provide such an improved picking arm in which the horizontal flexibility is adjustable.

Other objects and advantages of the present invention will be apparent from the following detailed description of a preferred embodiment taken in conjunction with the accompanying drawings.

DESCRIPTION OF THE DRAWINGS

FIG. 2 is an enlarged fragmentary top plan view of the right picking arm assembly as viewed in FIG. 1.

FIG. 3 is a fragmentary vertical elevational side view of the picking arm assembly, taken on line 3—3 of FIG. 2, and showing the operative inner face of the assembly, with portions of a guard plate broken away, as viewed from the centerline of the machine looking horizontally laterally outwardly.

FIG. 8 is a fragmentary perspective view of the trailing end of a picking arm assembly showing a modified finger construction, this view looking at the outside face assembly away from the machine centerline.

FIG. 9 is an enlarged vertical transverse sectional view of one of the modified fingers shown in FIG. 8, taken on line 9—9 thereof.

FIG. 10 is a fragmentary perspective view of the trailing end of a picking arm assembly showing another modified finger construction.

FIG. 11 is an enlarged fragmentary horizontal sectional view of the modified finger construction shown in FIG. 10, this view being taken generally on line 11—11 thereof.

FIG. 12 is an enlarged vertical sectional view of the modified finger construction shown in FIG. 10, the view being taken on line 12—12 thereof.

DESCRIPTION OF THE PREFERRED EMBODIMENT

Figure 1:
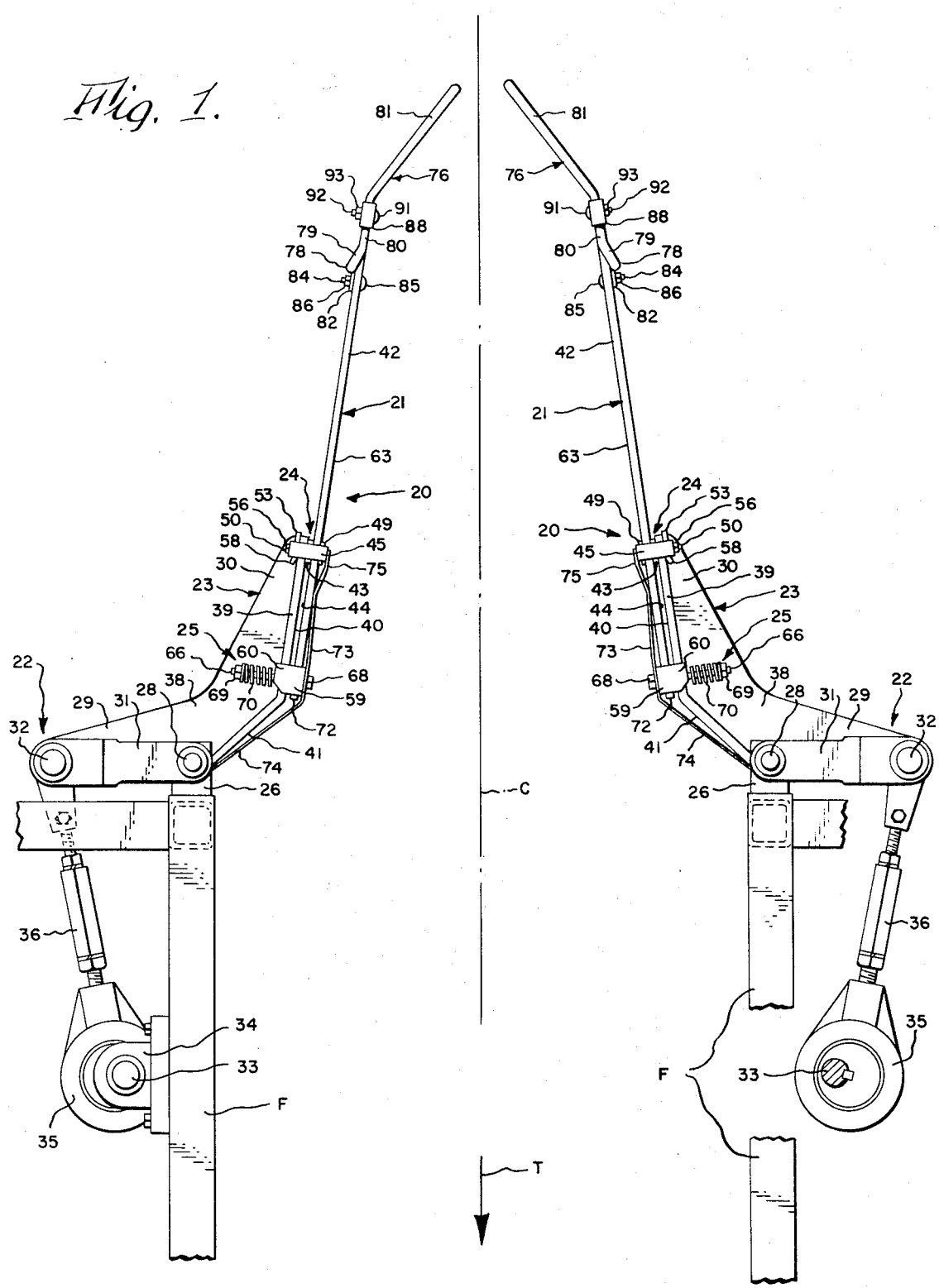
FIG. 1 is a top plan view of a pair of opposed produce picking arm assemblies, each constructed according to the present invention, movably arranged on the frame, fragmentarily illus-trated, of a harvesting machine movable alongside plants bearing produce to be harvested, such arms being disposed on opposite sides of the plants and arranged on said frame for movement back and forth transversely of the plants.

Referring to FIG. 1, C represents the centerline of a row of plants bearing fruit to be harvested such as a row of grapevines. A machine for harvesting such fruit is movable along such row in the travel direction represented by the arrow T and for that purpose there is shown in FIG. 1 the left and right hand portions of a mobile machine frame F which is arranged to straddle the row. Arranged on each frame portion illustrated on opposite sides of centerline C is a plurality of vertically spaced fruit picking assemblies severally represented generally by the numeral 20. Only the upper assembly is illustrated on each side of the row. Inasmuch as these assemblies are similar in construction, only a detailed description of one will be given, it being intended that such description will apply equally to the other assemblies.

The fruit picking means 20 is movable arranged on frame F and is shown as including rearwardly extending arm means 21, means 22 including an arm support member 23 for moving said arm means back and forth transversely of the row of plants, fulcrum means 24 providing a fulcrum permitting pivotal movement of the arm means relative to the support member in a direction transverse of the row of plants, and yielding means 25 operatively interposed between the support member and the arm means to restrain yieldingly pivotal movement therebetween in one relative direction about the fulcrum.

Frame F may be of any suitable construction and is shown as including vertical and horizontal tubular members suitably joined together by welding. From one vertical frame member a pair of vertically spaced horizontal lugs extend rearwardly, only the upper one 26 of which shows in FIG. 1. These lugs are apertured to receive an elongated vertical pivot pin 28. Support member 23 which is in the form of a bellcrank lever is suitably journaled intermediate its ends on pivot pin 28. This bellcrank member includes a lateral arm section 29 which extends horizontally outwardly from pivot pin 28 and a fore and aft section 30 which extends from this pin generally rearwardly and inwardly with respect to the machine travel line T.

While means for oscillating bellcrank lever 23 may be variously constructed, the same is shown as comprising a pair of vertically spaced horizontal links extending laterally outwardly from pivot pin 28, only the upper one 31 of which shows in FIG. 1. The outer ends of these links carry an elongated vertical pivot pin 32 suitably supported thereon. The outer end of the lateral arm section 29 of the bellcrank lever is suitably journaled on this pivot pin 32. An elongated vertical drive shaft 33 is journaled at opposite ends in upper and lower bearing pillow blocks mounted on frame F, only the upper one 34 of which is illustrated and then on the left hand side of the machine as viewed in FIG. 1. Crank and connecting rod means connect this drive shaft to pivot pin 32. This is shown as provided by a commercially avaiable eccentric mechanism 35 operatively connected to the drive shaft and suitably connected by an adjustable link 36 to pivot pin 32. It will thus be seen that rotation of drive shaft 33 will cause bellcrank lever 23 to oscillate about the vertical axis of pivot pin 28.

Bellcrank lever 23 is shown as having a horizontal rib 38 outstanding from an integral vertical plate 39. This plate along the arm section 30 has an inner flat vertical face 40 adjacent its rear end and a more outwardly inclined inner flat face 41 adjacent its front end and leading generally toward pivot pin 28.

Arm means 21 is shown as comprising an elongated bar 42, preferably made of fiberglass, of rectangular cross section and having a transverse dimension in a horizontal plane. This arm bar is arranged so that its forward portion opposes but is slightly spaced from the flat face 40 of bellcrank lever 23.

Figure 6:
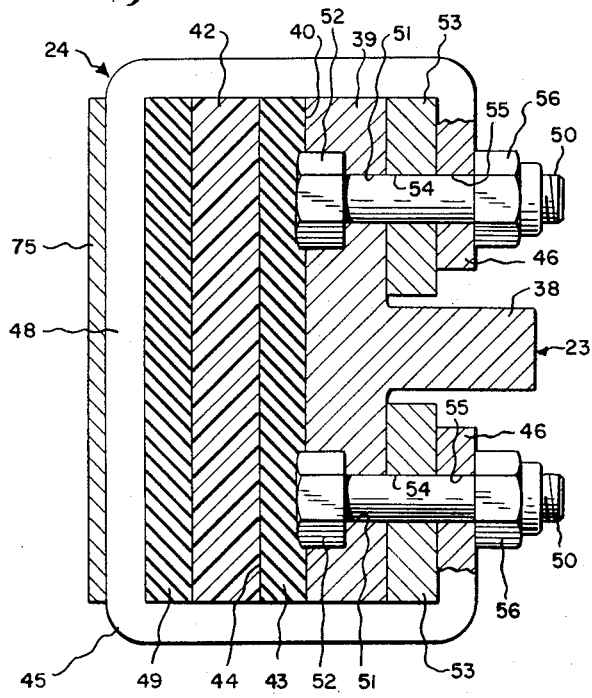
FIG. 6 is an enlarged vertical transverse sectional view thereof, taken on line 6—6 of FIG. 3, and showing the means providing a yielding fulcrum for the arm bar on its support member.

The fulcrum means 24 provides a fulcrum for arm bar 42 on its support member, the bellcrank lever 23. For this purpose, a fulcrum pad 43 of resilient material such as rubber is shown interposed between face 40 on support member 23 and the opposing face 44 on the arm bar. The fulcrum means also comprises hold down means for clamping arm bar 42 against fulcrum pad 43 backed up by support member 23. Such hold down means, as shown in FIG. 6, includes a clamp member 45 embracing the arm bar and support member. This clamp member is C-shaped, including inturned vertical end flange portions 46 and an intermediate vertical web portion 48 spaced from these flange portions. Arranged between arm bar and the inner face of web portion 48 of clamp member 45 is a cushion or pad 49 of resilient material such as rubber. The plate 39 of support member 23 on opposite sides of rib 38 is provided with a pair of outstanding vertically spaced horizontal studs 50. These are provided by providing a counterbored horizontal hole 51 through the portions of plate 39 above and below rib 39 and driving externally threaded bolts through such holes so that their hexagonal heads 52 at the corners between their flats dig into the cylindrical wall of the enlarged outer counterbored portion of the corresponding hole and thereby are prevented from rotating.

A shim 53 for each of end flange portions 46 of clamp member 45 is shown as interposed between the inside of it and the opposing side of the plate portion 39 of support member 23. Each shim is shown as having a slot 54 so that it can receive the shank of the corresponding stud 50. The flange portions 46 of the clamp member are severally provided with apertures 55 alined with openings 51 and slot 54 so that these apertures can receive the shanks of studs 50. A nut 56 is shown arranged on each of the studs and screwed down against the outside of the corresponding one of the end flange portions 46 of the clamp member to lock the shim firmly in place.

In assembling the fulcrum means, the fulcrum pad 43 and cushion 49 are not put in place initially so that web portion 48 of the clamp member 45 can be moved close enough to the arm bar 42 to allow the ends of studs 50 to be received in apertures 55 of the flange portions 46. Thereafter, nuts 56 are loosely applied to studs 50 and the clamp member 45 is moved back away from the plate 39 of the support member so that fulcrum pad 43 and cushion 49 can be inserted. Following this, the clamp member 45 is moved in the opposite direction so as to partially compress the pad and cushion and to allow insertion of the shims 53. Thereafter, nuts 56 are further tightened to maintain the pad and cushion in a compressed condition. It will be noted that the free ends of the U-shaped shims 53 are turned up slightly as indicated at 58 in FIG. 2 so that should these nuts loosen and the shims tend to retract, these upturned ends will retain the shims in position under the flange portions 46 of the clamp member.

Figure 7:
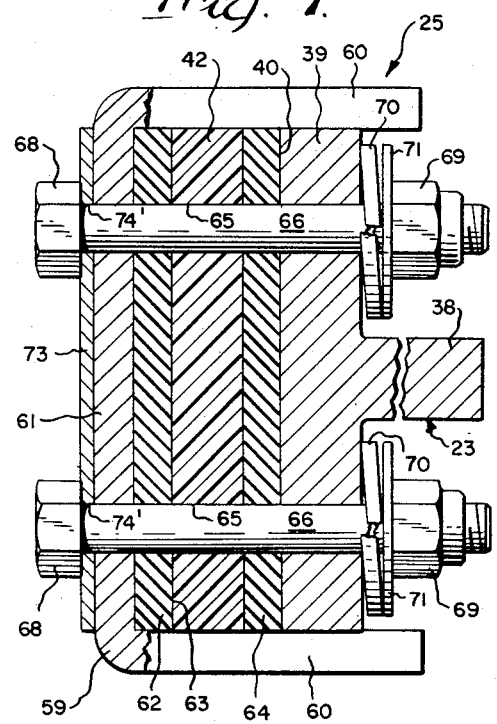
FIG. 7 is an enlarged vertical transverse sectional view thereof, taken on line 7—7 of FIG. 3, and showing the means to restrain yieldingly pivotal movement of the arm bar about its fulcrum on the support member.

Yielding means 25, as best shown in FIG. 7, comprises a C-shaped bracket 59 embracing arm bar 42 and support member 23 and including horizontal end portions 60 extending over the top and bottom edges of this arm bar and the plate portion 39 of this support member and also including an intermediate web portion 61 vertically disposed and connected to the ends of end portions 60. A cushion or pad 62 of resilient material such as rubber is shown interposed between the inside of this web portion and the opposing face 63 of arm bar. Another cushion or pad 64 of resilient material such as rubber is shown as interposed between the opposite side face 44 of the arm bar and face 40 of the support member. The web portion 61, cushions 62 and 64, arm bar 42 and plate 39 are provided with a pair of vertically spaced alined horizontal openings, each set being collectively indicated at 65. Each set of alined openings 65 is provided with a bolt 66 having a head 68 at one end and its shank externally threaded at the other end. Each bolt head 68 thrustingly bears against face 63 of the arm bar. The bolt shank 66 extends through the corresponding alined openings 65 and projects therefrom. A nut 69 is screwed on each such exposed threaded shank portion. Spring means 70 is shown as interposed between the plate 39 of support member and each nut 69 and is preferably in the form of a helical spring surrounding the shank of the corresponding bolt. A washer 71 is shown as arranged immediately under each nut to engage directly the corresponding end of the spring. It will be seen that the axial positions of the nuts 69 on their bolt shanks 66 determine the loading of the spring means. Adjustment is effected by tightening down or backing off the nuts 69.

As the harvesting machine moves along the row of plants and the picking arm assembly 21 is moved back and forth transversely of the row of plants, disposed along line C, if the picking arm engages an obstacle such as a pole or a cordon wire or a fairly rigid trunk, arm bar 42 can pivot on the fulcrum pad 43 and the springs 70 yieldingly allow excessive pivotal movement of this arm bar relative to its support member 23 about the yielding fulcrum in order to pass some obstruction, contact with such obstruction producing a sufficient force to deflect the arm bar outwardly. Not only is there inherent flexibility in arm bar 42, but additional flexibility due to the resilience of fulcrum pad 43. Springs 70 provide extra flexibility and can be adjusted as to increased or decreased effect by adjusting the loading on these springs.

In order to prevent abrasion of the front end 72 of arm bar 42 which is preferably made of fiberglass and also to prevent snagging of the clamp bracket 59 and clamp member 45, a guard plate 73 is arranged to cover the forward end portion of the picking arm assembly 21. This guard plate is in the form of a relatively thin sheet of metal having two holes 74 through which the shanks of bolts 66 pass whereby this plate is mounted on the picking arm assembly. The front portion 74 of the plate is bent laterally outwardly to cover the front end face 72 of arm bar 42 and the portion of the guard plate to the rear of bolt heads 68 lies relatively closely to the arm bar 42 but has a trailing laterally offset portion 75 which covers the front edge of the clamp member 45.

Finger means, indicated generally at 76, are provided on the trailing end of the arm means 21 and extend laterally therefrom. In FIGS. 1–5, such finger means is shown as comprising a length of metal rod bent to provide a central transverse vertical section 78 from the opposite ends of which extend a pair of offset sections 79 joined into a pair of parallel orizontal sections 80 terminating in a pair of angled fingers 81. Transverse section 78 is arranged against the outer side face 44 of arm bar 42. Parallel sections 80 extend along the upper and lower edges of the arm bar. The fingers 81 extend downwardly relative to the parallel sections 80 and also laterally relative thereof to point in a direction away from the transverse section 78. An ear 82 is shown as welded to transverse section 78 on the forward side thereof and is arranged to lie flat against face 44 of the arm bar. This ear and the arm bar are provided with alined horizontal apertures, collectively indicated at 83, to receive a fastener in the form of a stove bolt 84 having a head 85 bearing against side face 63 of the arm bar. A nut 86 is threadedly engaged on an externally threaded end portion of the bolt shank remote from its head 85 and is screwed down against ear 82.

Figure 4:
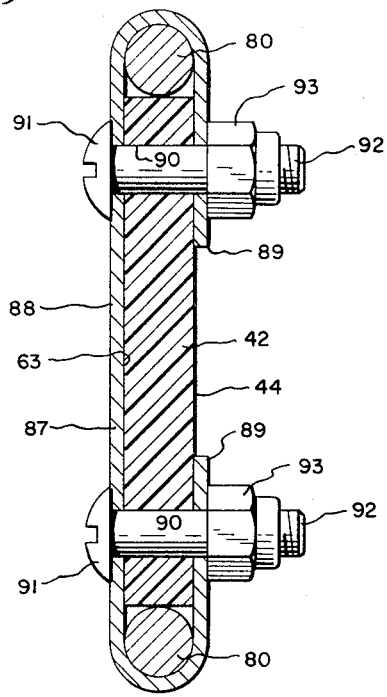
FIG. 4 is an enlarged vertical transverse sectional view thereof, taken on line 4—4 of FIG. 3, and showing how the fingers are clamped to the arm bar.
Figure 5:
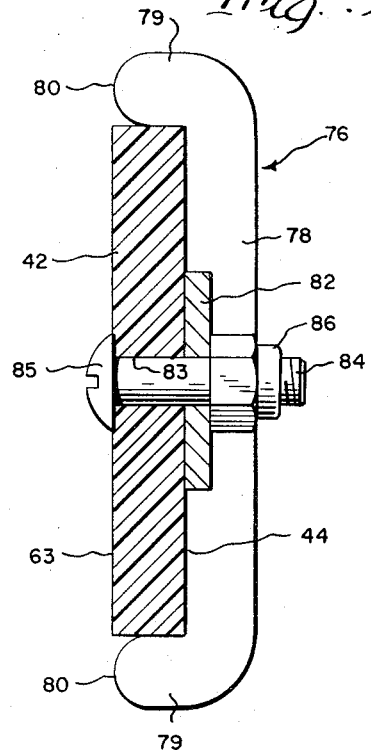
FIG. 5 is an enlarged vertical transverse sectional view thereof, taken on line 5—5 of FIG. 3, and showing how the rod from which the fingers are formed is additionally secured to the arm bar.

A clamp bar 88 is provided at the trailing end of arm bar 42 and, as best shown in FIG. 4, embraces the same and parallel rod sections 80 and has a web portion 87 and inturned end portions 89. Web portion 87 overlies side face 63 of the arm bar and protects it at its rear inside edge from abrasion. This clamp bracket including its end portions and the arm bar are provided with a vertically spaced pair of alined horizontal apertures, each set being collectively indicated at 90. A fastener for each such pair of alined apertures is provided, such fastener having a head 91 and a shank 92, the free end portion of which is externally threaded. The shank 92 of each such fastener extends through its set of alined apertures and the head 91 bears against the outside of the clamp bracket, a nut 93 being provided on the threaded end portion of the shank to bear against the outside of the end portions 89 of this clamp bracket.

Fingers 81 extend downwardly relative to the horizontal sections 80 as shown in FIG. 3 at an angle of about 25°. These fingers also extend inwardly toward the centerline C of the row relative to the longitudinal axis of the arm bar 42 also at an angle of about 25°, as viewed from above as illustrated in FIGS. 1 and 2.

Under certain circumstances, it might be desirable to have picking fingers of larger diameter than those shown in FIGS. 1–3. A modified construction of picking finger is shown in FIG. 8 in which a tube 94 of plastic material such as urethane tubing is arranged over each picking finger 81. This increases the diameter of the picking fingers which will reduce the leaf loss and may be more desirable in picking immature grapes. Leaf loss is more harmful to the grapevines in early picking. The resilient coating on the picking fingers provided by the urethane tubing tends also to reduce cane breakage late in the season when the cane is brittle. Further, a larger diameter finger can be made variable in diameter by applying different thicknesses of tubing so as to determine the best size for harvesting a particular variety of grape at harvest time.

Another modification of picking finger is illustrated in FIGS. 10–12. This modification comprises a curved finger member 95 formed of flexible material such as rubber which has a forward attaching section 96 of greater height than thickness arranged against the outside face 44 of arm bar 42 and a free trailing section 98 which gradually reduces in thickness toward its rear extremity and curves laterally across the rear end face 99 of said arm bar inwardly toward the centerline C of the row of plants being harvested. The upper and lower edges 100 of the free section 98 of this finger member are shown as converging toward the rear extremity.

A bracket plate 101 is provided for covering the vertical edge of this arm bar between this rear end face 99 and the inside surface 63 of this arm bar. The bracket has a flange portion 102 overlying such face 63. This flange portion 102, arm bar 42 and attaching section 96 are provided with a pair of vertically spaced alined horizontal apertures, each set being collectively indicated at 103. A fastener for each such set of alined apertures is provided, such fastener being in the form of a stove bolt 104 having a rounded head 105 and an externally threaded shank which extends through the alines apertures. A nut 106 is screwed onto the threaded shank and bears against the exposed side surface of the attaching section 96 of finger member 95. This construction of a flexible finger member tends to reduce cane breakage on over matured vines. Late in the grape harvesting season, for example, leaves fall off, thus exposing the cane, and the cane becomes very brittle, particularly during cold nights.

The penetrating fingers 81, with or without the tubing covers 94, and the finger member 95 reach into the center of the grape curtain and physically attack the bunches of grapes. The removal is more by a stripping action, particularly of the small diameter fingers 81, that strip off whole clusters and fragments of clusters. Consequently, there is less damage to the product and less juice lost on the machine.

The arm bar 42, preferably made of fiberglass, is in the form of a spring paddle and provides for vertical stiffness of the fingers 81 or 95 and horizontal flexibility for varying vine densities and shock absorbing. The flat panel nature of the arm bar also acts on the outside surface of the curtain of grapevines to provide for horizontal agitation of the entire curtain. Consequently, two methods are used to remove the grapes, namely stripping and shaking.

The coil springs 70 at the forward end of the paddle-like arm bars 42 provide for adjustment of force at the picking or trailing end of the arm. High force is provided for dense vines and hard-to-pick varieties. Low force is provided for thin vines and easy-to-pick varieties. Also, the springs 70 act as a safety release to allow the paddle-like arm bars to back off when hit by some vineyard obstruction. Inasmuch as the arm bar is preferably made of fiberglass and is suspectible to mechanical damage, it is protected by steel and rubber, thus increasing its mechanical life.

It is not intended to limit the use of the machine of the present invention to the harvesting of grapes, but the harvesting of produce including other fruits and even vegetables is contemplated if grown on plants, preferably arranged in a row, suitable for harvesting by the machine as defined in the appended claims.

What is claimed is:

1. In a machine for harvesting produce grown on plants and having a frame movable alongside the plants, wherein the improvement comprises produce picking means movably arranged on said frame including rearwardly extending arm means, means for moving said arm means back and forth transversely of the plants including a support member, fulcrum means providing a fulcrum permitting pivotal movement of said arm means relative to said support member in a direction transverse of the plants, and yielding means operatively interposed between said support member and said arm means to restrain yieldingly said pivotal movement therebetween in one relative direction about said fulcrum.

2. A machine according to claim 1 wherein said fulcrum means provides a yielding fulcrum for said arm means on said support member.

3. A machine according to claim 1 wherein said arm means includes an arm bar having a transverse dimension greater in a vertical direction than a horizontal direction.

4. A machine according to claim 3 wherein said fulcrum means comprises a fulcrum pad of resilient material interposed between opposing faces on said arm bar and said support member.

5. A machine according to claim 4 which further comprises hold down means for clamping said arm bar and said support member against said fulcrum pad.

6. A machine according to claim 5 wherein said hold down means includes a clamp member embracing said arm bar and said support member, means securing said clamp member to said support member, and a cushion of resilient material interposed between said arm bar and said clamp member.

7. A machine according to claim 6 wherein said support member includes a plate having a flat face on one side thereof and a rib outstanding from the other side thereof, said plate having a pair of externally threaded studs outstanding from said other side on opposite sides of said rib, said clamp member being C-shaped including end flange portions severally apertured to receive said studs and an intermediate web portion generally parallel to said end flange portions, said cushion being interposed between said web portion and one side of said arm bar, said flat face of said plate being one of said opposing faces the other of which is on said arm bar on the side thereof opposite from said one side of said arm bar, a shim for each of said end flange portions interposed between the inside of it and said other side of said plate, and a nut arranged on each of said studs and screwed down against the outside of the corrsponding one of said end flange portions to lock said shim in place.

8. A machine according to claim 3 wherein said yielding means comprises a bolt having a head and shank externally threaded remote from said head, said arm bar and said support member being provided with alined apertures to receive said shank, said head thrustingly bearing against that side of said arm bar remote from said support member, a nut screwed on such threaded shank portion, and spring means interposed between said support member and said nut, the axial position of said nut on said shank determining the loading on said spring means.

9. A machine according to claim 3 wherein said yielding means comprises a C-shaped bracket embracing said arm bar and said support member and having end portions and an intermediate web portion, a first cushion of resilient material interposed between the inside of said web portion and said arm bar, a second cushion of resilient material interposed between said arm bar and said support member, said web portion, cushions and support member being provided with a pair of spaced alined openings, a bolt for each set of said alined openings and having a head and shank externally threaded remote from said head, said head thrustingly bearing against the outside of said arm bar, said shank extending through said alined openings, a nut screwed on each such threaded shank portion, and spring means surrounding each bolt shank and interposed between said support member and its said nut, the axial positions of said nuts on said shanks determining the loading on said spring means.

10. A machine according to claim 5 wherein said hold down means includes a clamp member embracing said arm bar and said support member and having a web portion overlying a portion of one side of said arm bar, said yielding means includes a bracket embracing said arm bar and said support member and having an apertured web portion overlying another portion of said one side of said arm bar and provided with spaced apertures, bolts arranged in said apertures and having heads thrustingly bearing against the outside of said apertured web portion, and guard means including a guard plate interposed between such bolt heads and said outside of said apertured web portion and having apertures through which said bolts extend and covering the leading upright edges of said web portions and said arm bar and that portion of said arm bar intermediate said web portions.

11. A machine according to claim 1 wherein said produce picking means further comprises finger means on the trailing end of said arm means and extending laterally therefrom.

12. A machine according to claim 11 wherein said produce picking means further comprises clamp means embracing said arm means at the trailing end thereof and securing said finger means to said arm means.

13. A machine according to claim 11 wherein said finger means includes a pair of fingers which incline downwardly relative to said arm means inwardly toward the plants.

14. A machine according to claim 13 wherein said fingers at their forward ends are joined by an integral transverse section, means for securing said section to said arm means, and clamp means embracing said arm means at the trailing end thereof and securing said fingers to said arm means.

15. A machine according to claim 3 wherein said finger means comprises a rod bent to provode a central trasnverse section from the opposite ends of which extend a pair of offset sections joined to a pair of parallel sections terminating in a pair of angled fingers, said transverse section being arranged against one side of said arm bar, said parallel sections extending along the upper and lower edges of said arm bar, said fingers extending downwardly relative to said parallel sections and laterally relative thereto to point in a direction away from said transverse section, an ear secured to said transverse section and arranged against said arm bar, said ear and said arm bar being provided with alined apertures, a fastener having a portion extending through said alined apertures and securing said ear to said arm bar, a clamp bracket at the trailing end of said arm bar embracing the same and said parallel sections, said clamp bracket and said arm bar being provided with a spaced pair of alined apertures, and a fastener for each of said pair of alined apertures having a portion extending therethrough and securing said parallel sections to said arm bar.

16. A machine according to claim 15 wherein a sleeve is arranged on each of said fingers so as to increase its transverse dimension.

17. A machine according to claim 11 wherein said finger means is a curved member of flexible material.

18. A machine according to claim 3 wherein said produce picking means further comprises a curved finger member of flexible material which has a forward attaching section of greater height than thickness arranged against one side of said arm bar and a free trailing section which gradually reduces in thickness toward its rear extremity and moves laterally across the rear end face of said arm bar, the upper and lower edges of said free section converging toward said rear extremity, a bracket plate covering the edge of said arm bar between its said rear end face and the side of said arm bar opposite from said one side and having a flange portion overlying such opposite side, said flange portion, arm bar and attaching section being provided with a spaced pair of alined apertures, and a fastener for each of said pair of alined apertures having a portion extending therethrough and securing said bracket and finger member to said arm bar.

* * * * *

PO-1050
(5/69)

UNITED STATES PATENT OFFICE
CERTIFICATE OF CORRECTION

Patent No. 3,774,381     Dated November 27, 1973

Inventor(s) CHARLES G. BURTON

It is certified that error appears in the above-identified patent and that said Letters Patent are hereby corrected as shown below:

Column 2, line 17, delete the dash after "illus".

Column 3, line 56, "avaiable" should read --available--.

Column 4, line 3, after "a" (second occurence) insert --vertical plane greater than its transverse dimension in a--.

Column 9, line 42, "provode" should read --provide--.

Column 9, line 43, "trasnverse" should read --transverse--.

Signed and sealed this 23rd day of April 1974.

(SEAL)
Attest:

EDWARD M.FLETCHER,JR.
Attesting Officer

C. MARSHALL DANN
Commissioner of Patents